United States Patent Office 3,263,881
Patented August 2, 1966

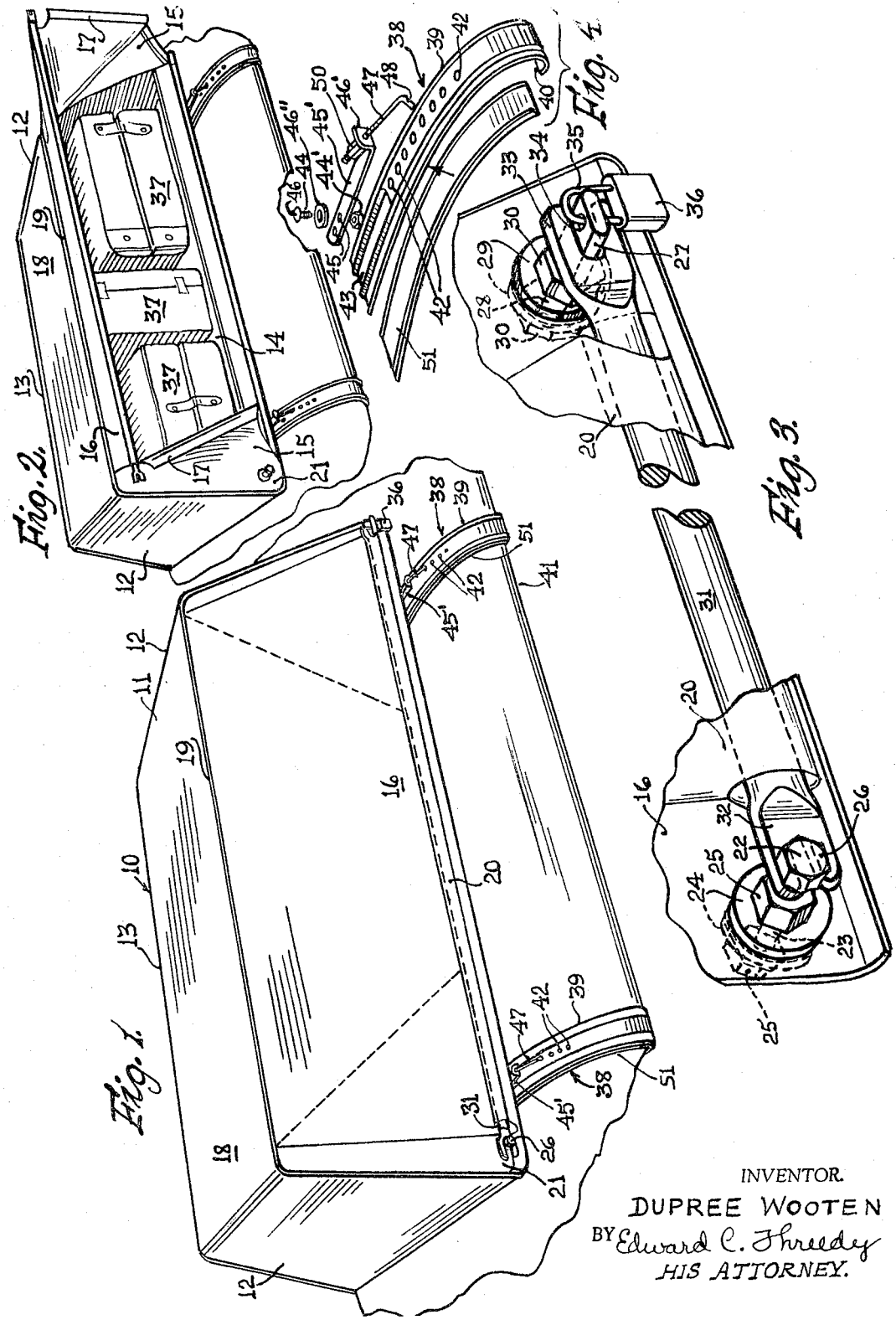

3,263,881
LUGGAGE AND ARTICLE CARRIER ADAPTED TO BE DETACHABLY MOUNTED UPON AN AUTOMOBILE ROOF
Dupree Wooten, 9401 W. William St., Rosemont, Ill.
Filed May 24, 1965, Ser. No. 458,192
3 Claims. (Cl. 224—42.1)

It is an object of my invention to provide such a carrier which may be conveniently and easily attached to and removed from mounted position upon the roof of an automobile and one wherein there is provided a side opening having a closure flap which is securely located in closed position over the opening when the carrier is in use.

Other objects will appear hereinafter.

The invention consists in the novel combination and arrangement of parts to be hereinafter described and claimed.

The invention will be best understood by reference to the accompanying drawings showing the preferred form of construction, and in which:

FIG. 1 is a perspective view of my improved carrier showing the same attached to the roof of an automobile;

FIG. 2 is a perspective view similar to FIG. 1 but showing the closure flap of the carrier in open position, said view being on a reduced scale;

FIG. 3 is a fragmentary perspective view showing the locking arrangement for the closure flap shown in FIG. 2;

FIG. 4 is a perspective view of the parts for attaching the carrier to the roof of an automobile.

It is desirable that the carrier generally indicated at 10 in the drawings be made of a relatively heavy and sturdy vinyl material, both from the standpoint of durability and to withstand rough usage when luggage is confined in the carrier, as well as the inclemencies of the weather.

The carrier, generally indicated at 10, comprises a substantially oblong shaped bag 11 having end walls 12, a side wall 13, and an open side 14. When the bag is mounted upon the roof of an automobile, the open side 14 thereof opens toward the right-hand side of the automobile, commonly known as the "curb side." This permits the luggage to be placed in and removed from the bag on that side of the car, away from passing traffic. The open side 14 is defined by end flaps 15 which fold upon themselves when the closure flap 16 is disposed in closing position with respect to the open side 14. The edges of the flaps 15 are reinforced by suitable piping 17.

The closure flap 16 is integral with the top wall 18 of the bag as at 19. Its lower end portion is provided with a transversely extending sleeve 20. Secured at the corner portions 21 of the flaps 15 is a bolt 22, the shank 23 of which extends through washers 24 on opposite sides of the closure flap 16 and secured in such position by nuts 25 threaded on the shank 23. The outer of the nuts 25 is spaced from the head 26 of the bolt 22.

A stud 27 substantially rectangular in cross section is formed as an integral part of a shank 28 which, like the shank 23, projects through washers 29 disposed on opposite sides of the corner portion of the flap 15 and secured thereto by nuts 30 threaded upon the shank 28. The washers 24 and 29 serve as reinforcement pieces for the flaps 15 at the point where the shanks 23 and 28 are secured thereto and prevent such shanks from being dislodged therefrom.

Positioned through the sleeve 20 is an elongated bar 31, one end 32 of which is bifurcated to removably receive the portion of the shank 23 between the head 26 and the outer of the nuts 25. The opposite end portion 33 of the bar 31 is bifurcated so as to receive the stud 27.

The stud 27 has an opening 34 formed therethrough through which is projected the lock bolt 35 of a conventional padlock 36. By this simple arrangement I removably secure the closure flap 16 in a closed position. By unlocking the padlock 36 and withdrawing the stud 27 from the bifurcated end 33 of the bar 31, the bar 31 can be easily and quickly moved longitudinally within the sleeve 20 to permit the flap 16 to be disposed in the position shown in FIG. 2, to allow the luggage 37 to be placed within the bag. After the luggage has been placed in the bag, the closure flap 16 is then moved to close the open side 14 of the bag, in which position the bar 31 may be again engaged with the bolt 22 and stud 27 and locked in such engaged position by the padlock 36, as hereinbefore described.

In the form shown in the drawings, I prefer to attach the bag 10 to the roof of the car by utilizing anchoring means 38, one at each corner of the bag 10 and each of a similar construction. In this connection, each anchoring means 38 includes an elongated arm 39 curved longitudinally to conform substantially to the shape of the roof of the car. Each arm 39 has an end portion formed to provide a hook 40 which is adapted to have hooked engagement with the gutter 41 of the car roof. Formed in the arm 39 is a plurality of aligned openings 42. The inner end portion of the arm 39 has a recess 43 formed therein to accommodate the nut 44' which is mounted on the bolt 44. The bolt 44 passes through the bottom of the bag 11 through one of two openings 45 formed in a plate 45'. The head 46 of the bolt 44 may be positioned upon an enlarged washer 46'' which serves to reinforce the bottom of the bag 10 at the point where the bolt is projected therethrough. The plate 45' has an angled end portion 46' which carries an adjustable bolt 47, one end 48 of which is angled laterally and is adapted to be selectively engaged in any one of the openings 42. The bolt 47 has a threaded end portion 49 which projects through the angled end portion 46' of the plate 45' and has threaded thereon an attaching nut 50.

When the arm 39 has its end portion 40 hooked to the gutter 41 of the car roof, there is positioned beneath the arm 39 a cushioning pad 51 of rubber or the like, which protects the roof of the car from being marred or scratched by the arm 39.

By this arrangement I provide a simple and expeditious arrangement for removably attaching a luggage carrier to the roof of an automobile. As the cover flap is locked in closed position, unauthorized access to the articles placed within the bag is prevented and such articles or luggage is prevented from accidentally falling from or being displaced from the bag. When not in use the carrier may be easily removed and placed in the trunk of the car for future use, or otherwise conveniently stored.

While I have illustrated and described the preferred form of construction for carrying my invention into effect, this is capable of variation and modification without departing from the spirit of the invention. I therefore do not wish to be limited to the precise details of construction set forth, but desire to avail myself of such variations and modifications as come within the scope of the appended claims.

Having thus described my invention, what I claim as new and desire to protect by Letters Patent is:

1. A luggage carrier for an automobile including
   (a) a storage bag carried on the roof of said automobile and formed of substantially heavy vinyl material and having an open side,
   (b) a flexible closure flap having one edge portion providing a hinge connection with said bag and having an opposite edge portion providing a sleeve,
   (c) a bar slidably positioned in said sleeve,
   (d) means for detachably connecting one end portion of the bar to a corner of the bag, said means comprising a head-bearing bolt fixedly connected to said corner portion of the bag and a bifurcation formed in said bar for the reception of said bolt to the rear of the head thereof, (e) and lock means for detachably connecting the opposite end portion of the bar to an opposite corner portion of the bag.

2. The luggage carrier as defined in claim 1 characterized by the inclusion of means for detachably connecting the carrier to the roof of said automobile, said means comprising anchoring arms for each corner portion of the carrier, and each arm having a hook-shaped end portion for hooked engagement with the gutter of said roof and a hook bolt adjustably carried by said carrier for connection with said arm.

3. A luggage carrier for an automobile including (a) a storage bag carried on the roof of said automobile and formed of substantially heavy vinyl material and having an open side,
(b) a flexible closure flap having one edge portion providing a hinge connection with said bag and having an opposite edge portion providing a sleeve,
(c) a bar slidably positioned in said sleeve,
(d) means for detachably connecting one end portion of the bar to a corner of the bag,
(e) and lock means for detachably connecting the opposite end portion of the bar to an opposite corner portion of the bag, said lock means comprising a bolt portion connected to said opposite corner portion of the bag with the bolt providing a relatively flat stud positioned in a bifurcated end portion of said bar and a key-actuated lock having the bolt thereof projected through an opening formed in said stud.

References Cited by the Examiner

UNITED STATES PATENTS

| 1,867,272 | 7/1932 | Larsen | 135—5 X |
| 2,621,836 | 12/1952 | McMiller | 224—42.1 |
| 2,771,231 | 11/1956 | Hare | 224—42.1 |
| 3,179,316 | 4/1965 | McMiller | 224—42.1 |
| 3,190,515 | 6/1965 | Vielle | 224—42.1 |

GERALD M. FORLENZA, *Primary Examiner.*

F. WERNER, *Assistant Examiner.*